(12) United States Patent  (10) Patent No.: US 6,721,073 B1
Segawa et al.  (45) Date of Patent: Apr. 13, 2004

(54) IMAGE INPUT DEVICE AND METHOD

(75) Inventors: Satoshi Segawa, Tokyo (JP); Masato Iwakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/453,154

(22) Filed: Dec. 2, 1999

(30) Foreign Application Priority Data

Dec. 4, 1998 (JP) .......................................... 10-346153

(51) Int. Cl.[7] ................................................. H04N 1/04
(52) U.S. Cl. ....................... 358/475; 358/462; 358/446; 358/494; 358/464
(58) Field of Search ................................. 358/474, 518, 358/494, 488, 475, 462, 464, 463, 461, 446

(56) References Cited

U.S. PATENT DOCUMENTS 4,754,143 A * 6/1988 Fukai et al. ................ 250/587
5,818,612 A * 10/1998 Segawa et al. ............. 358/494
6,034,794 A * 3/2000 Suganuma .................. 358/518

FOREIGN PATENT DOCUMENTS

JP 63314684 A * 12/1988 ......... G06K/13/067
JP 9-153988 6/1997
JP 10-294891 11/1998

* cited by examiner

Primary Examiner—Edward Coles
Assistant Examiner—Heather D Gibbs
(74) Attorney, Agent, or Firm—Scully, Scott, Murphy & Presser

(57) ABSTRACT

There is disclosed an image input method, comprising the steps of: forming an image of a linear area on an original onto a row of linearly arranged light receiving elements of a linear image sensor by a lens, and outputting an image signal of the linear image formed on the light receiving elements from the linear image sensor. Moreover, the linear area formed into the image on the linear image sensor is moved by a sub-scanning mechanism to scan the entire image of the original. The linear image sensor further outputs a flicker detection signal having a voltage corresponding to a lighting light quantity radiating to the original. Assuming that a photoelectric conversion property of the linear image sensor is linear, a correcting section eliminates a voltage fluctuation of the image signal based on a fluctuation of the lighting light quantity based on the flicker detection signal. In this case, a voltage for eliminating an influence by nonlinearity of the photoelectric conversion property of the linear image sensor is added to the image signal or the flicker detection signal inputted to the correcting section by an image signal correction circuit.

16 Claims, 9 Drawing Sheets

IMAGE INPUT DEVICE AND METHOD

BACKGROUND OF THE INVENTION (i) Field of the Invention present invention relates to an image input device and method for converting characters and images to reading digital data, particularly to an image input device and method provided with a linear image sensor and a sub-scanning mechanism for scanning images of line units inputted to the linear image sensor in a perpendicular direction to the lines to read characters and images.

(ii) Description of the Related Art

In a conventional image input device generally called an image scanner device, a linear image sensor is used as an image pickup element of an image input mechanism section, and partial images of line units obtained by the linear image sensor are successively combined in a perpendicular direction to lines to input a two-dimensional original image by a sub-scanning mechanism. For example, as disclosed in Japanese Patent Application Laid-Open No. 291259/1987, this type of image input device is constituted such that the image input mechanism section provided with the image pickup element is supported by a stand, and the like. In the image input device, an original image surface is distant from the image input mechanism section, no special lighting is performed for the image scanner device, and the lighting of the original surface is secured by natural light or the lighting by a fluorescent lamp for use as a usual ceiling lamp. However, in the lighting system, when a speed for incorporating the image is increased, influences such as an illuminance change (flicker) with an elapse of time generated in the fluorescent lamp are exerted, and a phenomenon of transverse streak generated in the image at a flicker period occurs. A method of reducing adverse influences such as the flicker by the change of lighting light quantity is disclosed in Japanese Patent Publication No. 19311/1989.

The method described in the Japanese Patent Publication No. 19311/1989 comprises disposing a plate member provided with a reference reflection section with an optical density as a reference in the vicinity of an original, and disposing a light receiving element in which a plurality of light receiving portions are arranged so that some portions detect image information from the original and other portions detect lighting information from the reference reflection section. The light receiving element is scanned in a perpendicular direction to the arrangement direction of the light receiving portions, and an image signal and a lighting signal are switched during the scanning of one line so that these signals are alternately outputted. Thus, lighting signals exist in the beginnings of one-line scannings. Then, a peak hold circuit controls AGC circuit to adjust levels of lighting signals of subsequent lines such that they agree with the level of a first lighting signal. Thereby, the level of the image signal of each line is corrected, and the image signal is obtained from which the level change caused by a change of lighting brightness is removed.

However, in an environment in which a special auxiliary lighting is not used for the image scanner, output voltages in a lighting light quantity detection signal and an image signal are small, and the adverse influence by noises is easily exerted.

Therefore, for a sample hold output on which sample holding has been performed on the signals to detect flickers, offset components are superimposed on minute output signals. If the offset component is superimposed only to the image signal or only to the flicker detection signal, it cannot usually be eliminated by a simple division, and remains as the influence of the flicker.

Furthermore, in the system of detecting lighting light radiating to the original surface as a flicker removing signal, a nonlinearity of photoelectric conversion property of the linear image sensor becomes a problem. Specifically, the linear image sensor does not necessarily correspond linearly to the output signal for the brightness, and the nonlinear property becomes relatively remarkable particularly in a dark area with a small signal. An example of the photoelectric conversion property of the linear image sensor having this nonlinearity is shown in FIG. 9.

In FIG. 9, for the photoelectric conversion property having the nonlinearity shown by a curve 100, in a usual brightness, it is assumed that the linear image sensor has a linear photoelectric conversion property curve 101, but in an area with a small light quantity, the property is curved, the origin of linear property deviates, and a sensor output voltage drops. Moreover, even in the light quantity of zero, the voltage does not become zero, and the offset component by noise is superimposed to the photoelectric conversion property.

Here, it is assumed that the lighting light radiated to the original is guided to the linear image sensor to detect a flicker component, the flicker detection light quantity fluctuates in the range of L1 to L3, while the quantity of light reflected from the original, that is, the light quantity for generating the image signal fluctuates in the range of L2 to L4. In this case, the sensor output voltage corresponding to the flicker detection light quantity fluctuates in the range of V1 to V3 which is converted by the substantially linear property. However, since the influence of the origin deviation of the linear property is large in the range of L2 to L4, the ratio of V2 and V4 is largely different from the ratio of L2 and L4.

Therefore, even when the ratio of L1 and L2 is the same as the ratio of L3 and L4, the ratio of V1 and V2 differs from the ratio of V3 and V4. Specifically, the linear relation to the brightness collapses between the lighting light quantity detection signal and the image signal. Even if the image signal is divided, the flicker component cannot be removed.

SUMMARY OF THE INVENTION

An object of the present invention is to, when an image is taken by an indirect type image scanner, effectively remove a transverse streak image attributed to flicker phenomenon of a ceiling lamp, even if light taken into a linear image sensor from an original image surface becomes insufficient and the nonlinearity of photoelectric conversion property of the linear image sensor becomes remarkable, or even if noise of a signal processing system raises a problem, and to enhance the image quality of a read image even when the image is read in a dark environment or at a high speed.

To achieve the object, according to the present invention, there is provided an image input device which comprises a linear image sensor provided with a plurality of linearly arranged light receiving elements for outputting an image signal of a linear image formed on the light receiving element; an image forming optical system for forming an image of a linear area on an original onto a row of the light receiving elements of the linear image sensor; a sub-scanning mechanism for moving the linear area formed into the image on the linear image sensor to scan the entire image of the original by the linear image sensor; a lighting light quantity detecting section for outputting a lighting light quantity signal indicative of a voltage corresponding to a lighting light quantity radiating to the original; a correction voltage adding section for adding a correction voltage to at least one of the lighting light quantity signal and the image signal to eliminate an influence by nonlinearity of a photoelectric conversion property of the linear image sensor and the lighting light detecting section; and a correcting section for eliminating a voltage fluctuation by a fluctuation of the lighting light quantity of the image signal with or without the correction voltage added thereto based on the lighting light quantity signal without or with the correction voltage added thereto.

Furthermore, the correction voltage adding section comprises either one of a first voltage adding circuit for adding a first voltage to the lighting light quantity signal to eliminate the influence by the nonlinearity of the photoelectric conversion property of the linear image sensor and the lighting light detecting section, and a second voltage adding circuit for adding a second voltage to the image signal to eliminate the influence by the nonlinearity of the photoelectric conversion property of the linear image sensor and the lighting light detecting section. The correcting section comprises a division circuit for using the lighting light quantity signal or the lighting light quantity signal with the first voltage added thereto as a denominator input, and using the image signal with the second voltage added thereto or the image signal as a numerator input to perform division.

According to the present invention, the voltage is added to the lighting light quantity signal or the image signal to eliminate the influence by the nonlinearity of the photoelectric conversion property of the linear image sensor and the lighting light detecting section, and the lighting light quantity signal without or with the voltage added thereto is used as the denominator input and the image signal with or without the voltage added thereto is used as the numerator input to perform the division. Thereby, when the light from the original is so weak that the image signal output with a sufficient voltage cannot be obtained from the linear image sensor, when a plus or minus offset voltage is superimposed as a noise to the image signal output from the linear image sensor, and further even when the input light quantity from the original is minute to a degree such that the nonlinearity becomes remarkable in the photoelectric conversion property of the linear image sensor, the influence of the offset voltage or the nonlinearity of the photoelectric conversion property of the linear image sensor is removed, a virtual black voltage obtained by extending the linear property of a portion in which the image signal is generated can be set to zero, and the flicker component included in the image signal can be removed by the division.

Moreover, in the image input device according to another aspect of the present invention, the correction voltage adding section comprises a first voltage adding circuit for adding a first voltage to the lighting light quantity signal to eliminate the influence by the nonlinearity of the photoelectric conversion property of the linear image sensor and the lighting light detecting section, and a second voltage adding circuit for adding a second voltage to the image signal to eliminate the influence by the nonlinearity of the photoelectric conversion property of the linear image sensor and the lighting light detecting section. The correcting section comprises a division circuit for using the lighting light quantity signal with the first voltage added thereto as a denominator input, and using the image signal with the second voltage added thereto as a numerator input to perform division.

According to the present invention, the voltage is added both to the lighting light quantity signal and the image signal to eliminate the influence by the nonlinearity of the photoelectric conversion property of the linear image sensor and the lighting light detecting section, and the lighting light quantity signal with the voltage added thereto is used as the denominator input and the image signal with the voltage added thereto is used as the numerator input to perform the division. Thereby, not only a virtual black voltage obtained by extending the linear property of a portion in which the image is formed and the image signal is generated, but also a virtual black voltage obtained by extending the linear property of a photoelectric converting element used for detecting the lighting light quantity can exactly be set to zero, and the flicker correction by the division is appropriately processed. Even if the detected lighting light quantity has a brightness such that the nonlinearity of the linear image sensor raises a problem, the flicker removing correction can securely be performed. Furthermore, even when the use environment changes and the offset component deviation attributed to natural light is generated in the flicker detection signal and the image signal, the flicker components can be removed.

DETAILED DESCRIPTION OF THE PREFERRED EMBODIMENTS

Embodiments of the present invention will next be described in detail with reference to the drawings.

Figure 1:
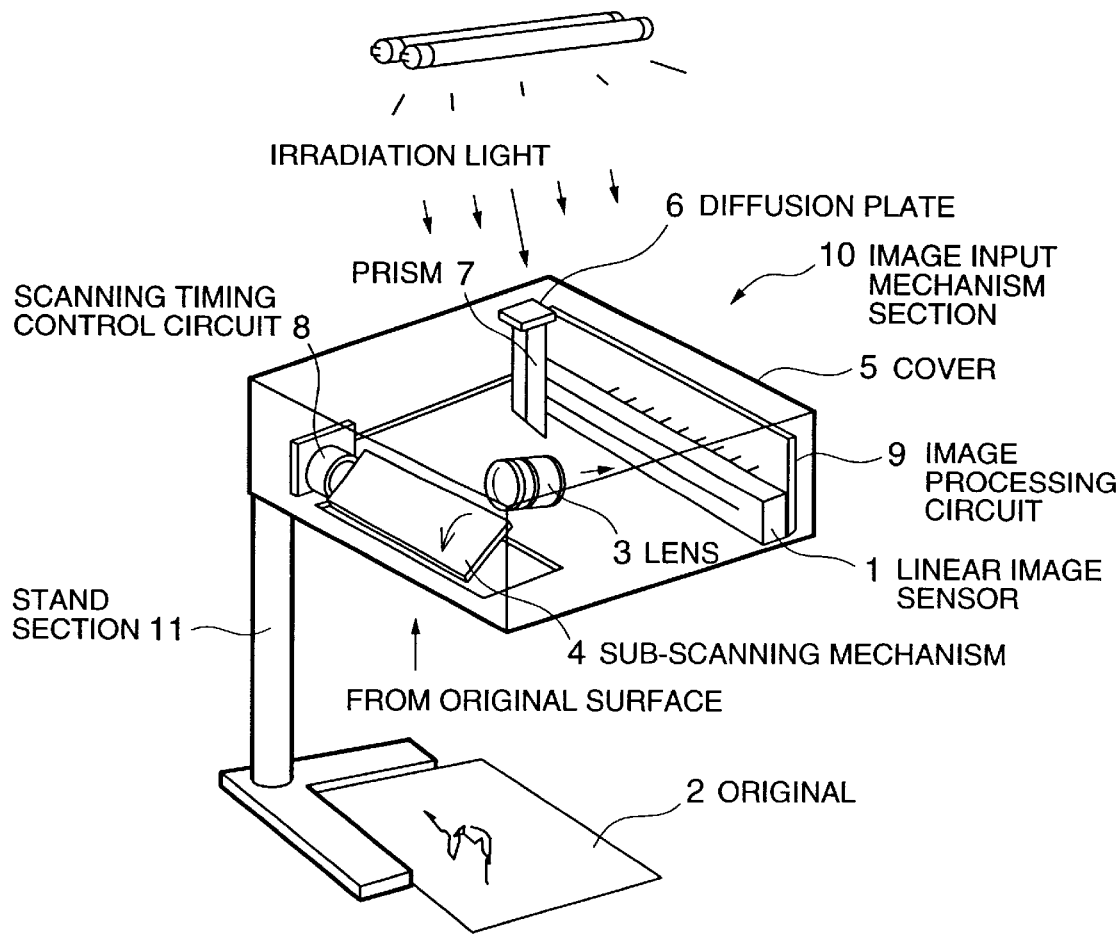
FIG. 1 is a schematic perspective view showing the constitution of a first embodiment of the present invention.

FIG. 1 is a perspective view showing the constitution of a first embodiment of the present invention.

Referring to FIG. 1, an image input device of the present invention comprises an image input mechanism section 10 comprising a linear image sensor 1 as an image pickup element in which fine light receiving elements are linearly arranged, a lens 3 for forming an image of an original 2 to the linear image sensor 1, a sub-scanning mechanism 4 for scanning the image of the original 2 incident upon the lens 3 in a perpendicular direction to an arrangement direction of the light receiving elements of the linear image sensor 1, a cover 5 covering these components to prevent light other than the light incident from the original 2 from entering the linear image sensor 1, a diffusion plate 6 for diffusing and taking lighting light radiated from above in the same manner as the light radiated to the original, a prism 7 for transmitting the light taken from the diffusion plate 6 to a part of an image reading start side of the linear image sensor 1, a scanning timing control circuit 8 for outputting a timing signal for moving an area of a partial image inputted to the linear image sensor 1 to control the scanning of the sub-scanning mechanism 4, and an image processing circuit 9 for referring to a light quantity level taken from the diffusion plate 6 and performing correction to eliminate an influence of a fluctuation of the lighting light from an image signal as a signal of a portion corresponding to the image of the original 2 among signals outputted from the linear image sensor 1 and further for referring to the timing signal and combining the partial image with a corrected output level to obtain a two-dimensional original image; and a stand section 11 for supporting the image input mechanism section apart from the original 2.

The diffusion plate 6 for detecting the light radiated to an original surface is disposed on the cover 5 and directed to a direction (usually upward) in which the light is radiated to the original 2 to transmit the light from a wide angle range centering on the direction.

The stand section 11 holds a constant distance between the original 2 and the image input mechanism section 10 while inputting the image, and has an open type constitution in which the light from the outside is radiated to the image of the original 2 at least from the outside, so that the original 2 is prevented from being completely covered.

Figure 2:
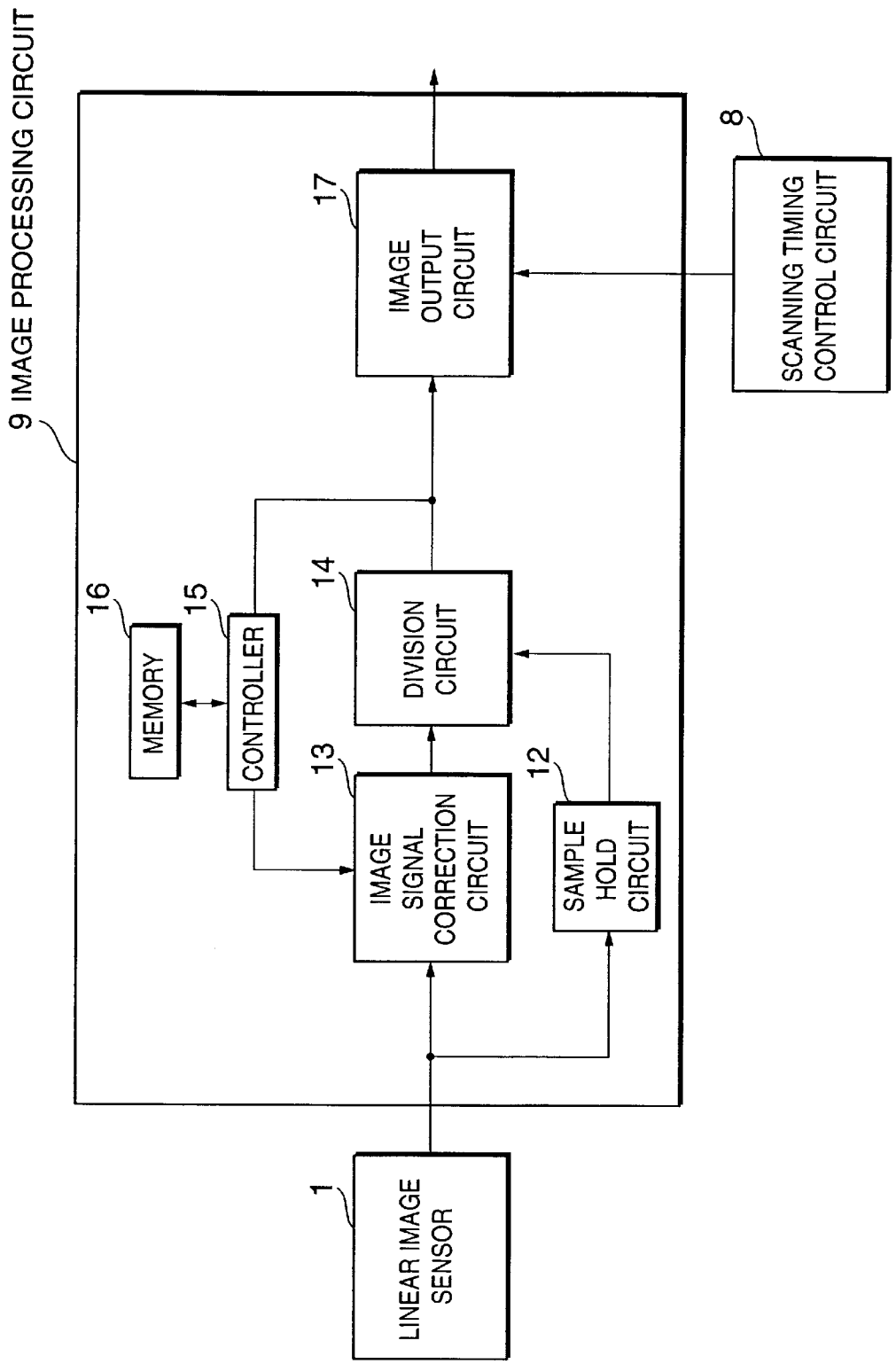
FIG. 2 is a block diagram showing the constitution of the first embodiment of the present invention.

The circuit constitution for performing flicker correction of the first embodiment of the present invention will next be described with reference to the drawing. FIG. 2 is a block diagram showing the constitution of the first embodiment of the present invention.

The image processing circuit 9 comprises a sample hold circuit 12 for sampling/holding a signal level of the portion upon which the lighting light is incident from the signal outputted from the linear image sensor 1; an image signal correction circuit 13 for adding an offset voltage indicated by a controller 15 to the image signal, correcting the image signal so that the influence of a flick does not appear on the read image, and outputting the corrected image signal; a division circuit 14 for using the corrected image signal as a numerator input and a flicker signal outputted from the sample hold circuit as a denominator input; the controller 15 for outputting an offset voltage control signal to indicate the offset voltage in the image signal correction circuit 13; a memory 16 for storing a program for determining the offset voltage and data necessary for determining the offset voltage; and further an image output circuit 17 for referring to the timing signal from the scanning timing control circuit 8 and combining the partial image with the corrected output level to output the two-dimensional original image.

The signal outputted from the linear image sensor 1 includes a portion which indicates, for each scanning line, a level of light incident from the prism 7 at the beginning on the reading start side before the image signal is outputted, and the level of the light incident from the prism 7 and the image signal are influenced by the flicker of a fluorescent lamp or the like and change with each scanning line.

The sample hold circuit 12 samples a signal level of a portion upon which the lighting light is incident, holds the voltage level until the next sampling, and outputs a flicker detection signal.

The image signal correction circuit 13 has an electronic volume element (not shown), and adds the offset voltage to the image signal to minimize flicker components in the output from the division circuit based on the offset voltage control signal from the controller 15 by the operation described later so that the image signal is corrected.

The division circuit 14 performs the division on the corrected image signal outputted from the image signal correction circuit 13 by using the flicker detection signal outputted from the sample hold circuit 12 as a denominator and outputs the image signal from which the flicker components are removed.

The operation for determining the offset voltage to perform the flicker correction of the image signal of the first embodiment will next be described with reference to the drawing.

Figure 3:
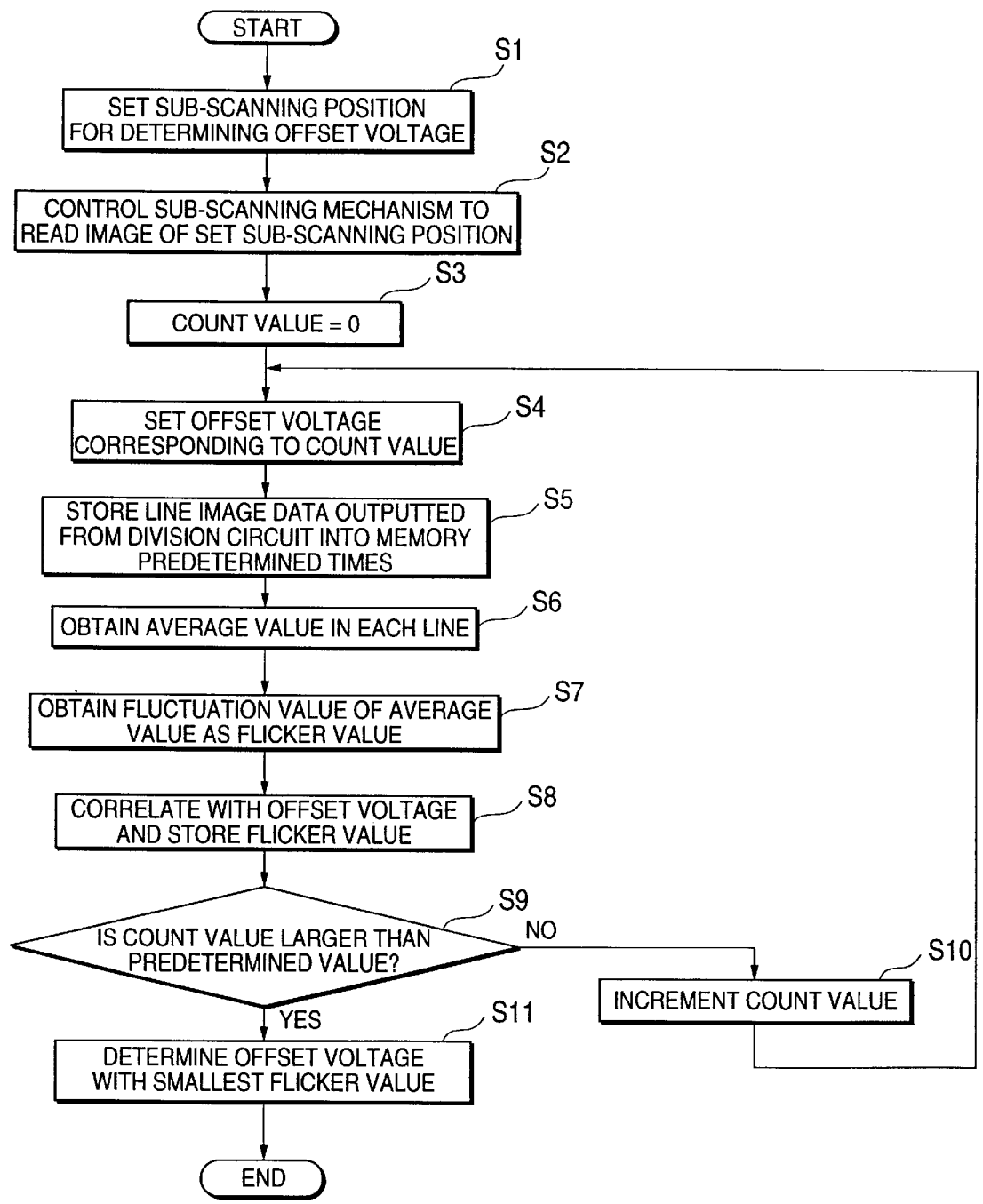
FIG. 3 is a flowchart showing an example of operation for determining an offset voltage in the first embodiment of the present invention.

FIG. 3 is a flowchart showing an example of the operation for determining the offset voltage in the first embodiment of the present invention.

When an offset control voltage setting processing starts, a portion of a predetermined scanning area is set with respect to the original as an object to be read by an operator's input (step S1). In this case, the portion which is in the vicinity of center of the original surface, whose image density is not black and which has a representative density of the original surface may be set by the operator's input. Alternatively, after first scanning the entire, measuring the density of the original and obtaining a position having an average density, the position may be set. Moreover, by inputting original types, the original types may be set beforehand.

Subsequently, the sub-scanning mechanism 4 is controlled by the scanning timing control circuit 8 and moved so that a preset partial sub-scanning area, that is, a linear image of a specific position is inputted to the linear image sensor 1 (step S2).

Next a count value c is set to zero (step S3). The controller 15 refers to an offset voltage determining table (not shown) indicating the offset voltage to be added in the image signal correction circuit 13 in accordance with the count value c indicating the frequency of performed partial sub-scanning, and sets the offset voltage to be added in the image signal correction circuit 13 corresponding to the count value c (step S4). Subsequently, the image data of the partial sub-scanning area of the image of the original 2 is obtained, the set offset voltage is added to the image signal in the image signal correction circuit 13 based on the offset voltage control signal from the controller 15, and the image data outputted from the division circuit is stored in the memory (step S5). Next, the data of main scanning direction are averaged for a line unit with respect to the frequency of p times read for a time equal to or longer than one period of the flicker of adjusting data (step S6). Subsequently, the fluctuation value of the averaged data for the p lines is calculated (step S7). Next, the offset voltage value and the calculated flicker fluctuation value are correlated and stored (step S8). The flicker fluctuation value means a difference between a maximum voltage and a minimum voltage of the image signal for the image of the same density in the original. Subsequently, it is judged whether the count value c is larger than a predetermined value r (step S9). When it is smaller, the count value is incremented (step S10), thereby returning to the step S4, in which the offset voltage determining table is referred based on the count value to set a new offset voltage, and the image data of the same partial sub-scanning area as the previous area is obtained, then repeating the processing of the steps S5 to S9. Subsequently, the value of the offset voltage to be added in the image signal correction circuit 13 is changed in a stepwise manner, while the flicker fluctuation value is calculated and stored until the desired frequency r is reached. In the step S9, when the count value is larger than the predetermined frequency r, the smallest value is retrieved among the stored flicker fluctuation values and the offset voltage corresponding to the flicker fluctuation value is determined as an offset voltage V0 which most reduces the flicker in the installation conditions of that time (step S11). The controller 15 indicates the offset voltage of the image signal correction circuit 13 by the offset voltage control signal corresponding to the obtained offset voltage until the next offset control voltage setting processing is performed.

The offset voltage can be determined by these operations, so that by adding the offset voltage to the image signal, the origin deviation of the photoelectric conversion property of the area in which the image signal is generated is corrected and the flicker fluctuation value can be minimized.

Additionally, in the above description, the portion of the predetermined scanning area is set with respect to the original as the read object by the operator's input, but the portion may be preset in the image input device. In this case, the trouble of the operator's input can be saved.

Moreover, instead of automatically determining the offset voltage as described above, by providing the image signal correction circuit 13 and a flicker signal correction circuit 19 with a variable resistance for adjusting an offset amount, the offset amount may naturally be adjusted by manual adjustment.

A modification of the image processing circuit 9 will next be described.

Figure 4:
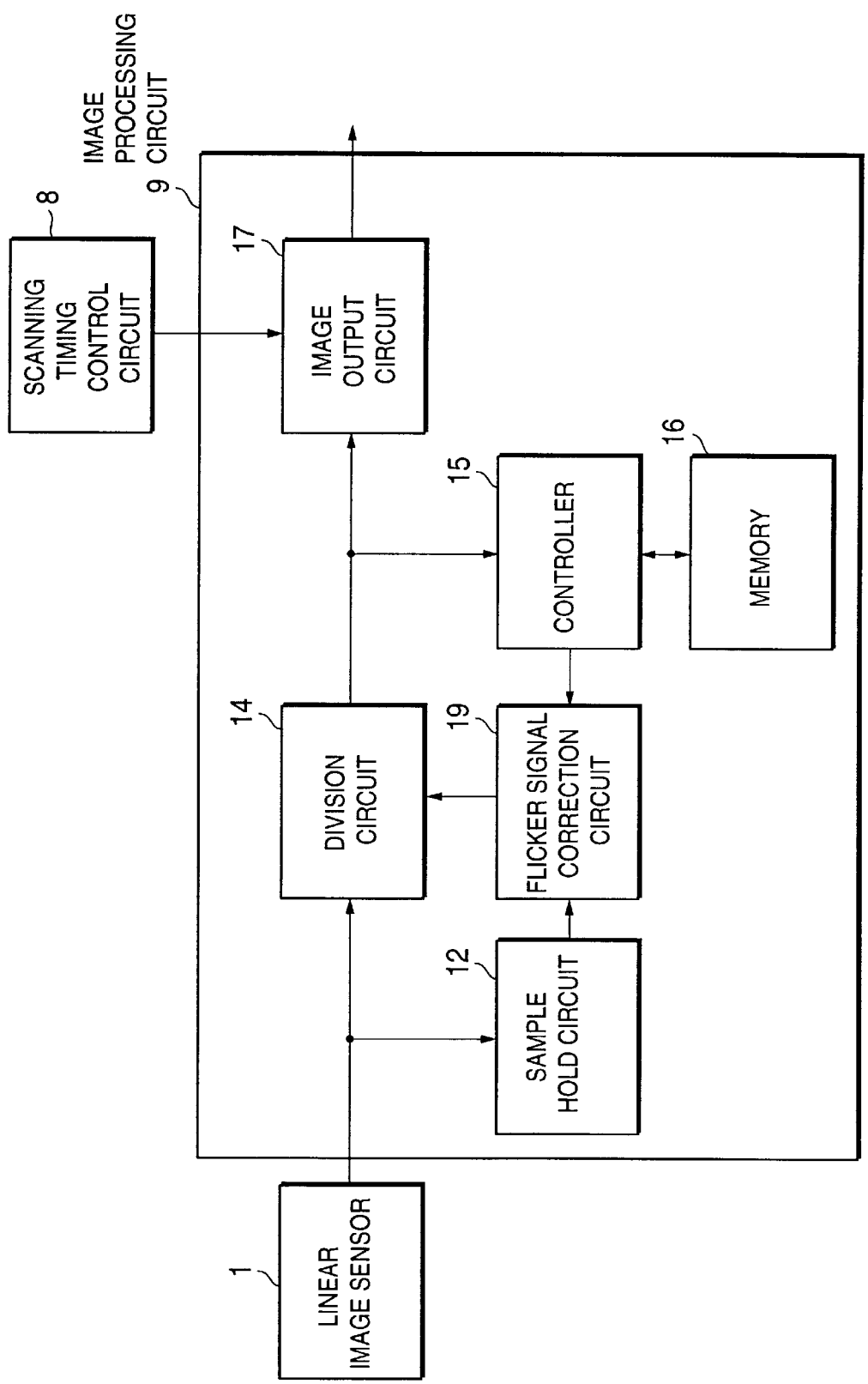
FIG. 4 is a block diagram showing a second example of an image processing circuit according to the first embodiment of the present invention.

FIG. 4 is a block diagram showing a second example of the image processing circuit according to the embodiment.

This example is different from the first example in that the offset voltage is added only to the flicker detection signal to perform the correction, and the offset voltage is not added to the image signal.

Since the flicker signal correction circuit 19 can add or reduce a voltage for the offset voltage with respect to the flicker detection signal, it is equivalent to a constitution for relatively giving offset to the image signal. Therefore, the flicker components of the image signal can be removed by the division circuit 14 in the same manner as in the first example.

When there is a sufficient quantity of light incident upon the linear image sensor for the flicker correction, the linearity is substantially satisfied in the photoelectric conversion property of the light quantity range used in the flicker correction. However, when the lighting light quantity is insufficient, the light from the original is weak, and the image signal is generated in the area in which the nonlinear property of the linear image sensor is remarkable. But even in this case, according to the above-described first embodiment, by adding the offset voltage determined based on the above-described operation to the image signal, the virtual black voltage obtained by extending the linear property of the portion in which the image is formed and the image signal is generated can be allowed to agree with zero. Therefore, in the corrected image signal, the voltage fluctuates at the same ratio as the fluctuation ratio of the flicker detection signal proportional to lighting fluctuation, and the flicker correction by a divider is appropriately processed.

Moreover, even in the second example in which the offset voltage is added to the flicker detection signal instead of the image signal, the same result is obtained.

Figure 9:
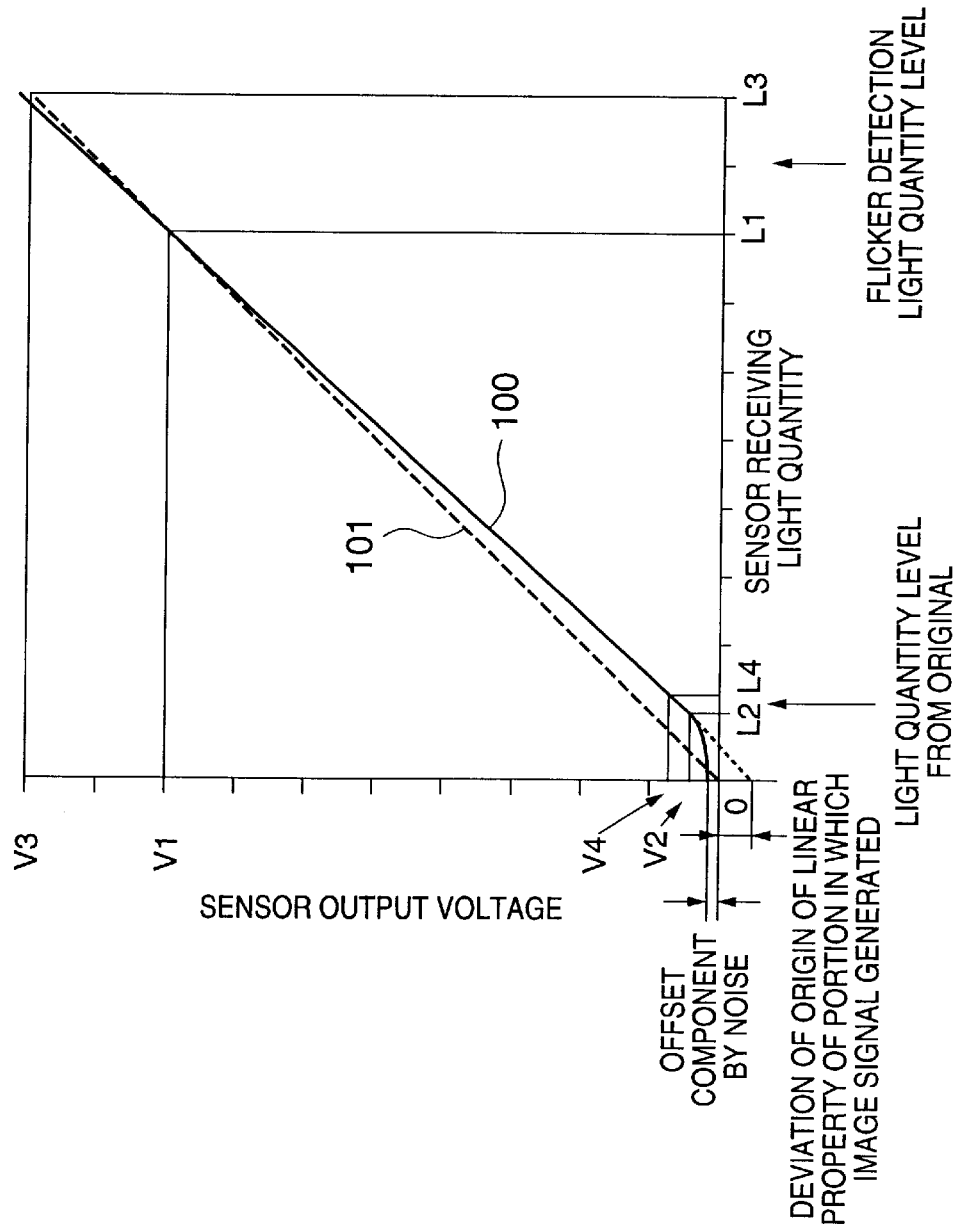
FIG. 9 is a diagram showing an example of a photoelectric conversion property of a linear image sensor having nonlinearity.

Moreover, even the offset components superimposed as the noises to the image signal as shown in FIG. 9 (in both the plus and minus voltages) are simultaneously corrected. Therefore, even when the offset components exist in the image signal, the flicker processing can normally be operated.

A second embodiment of the present invention will next be described with reference to the drawing.

Figure 5:
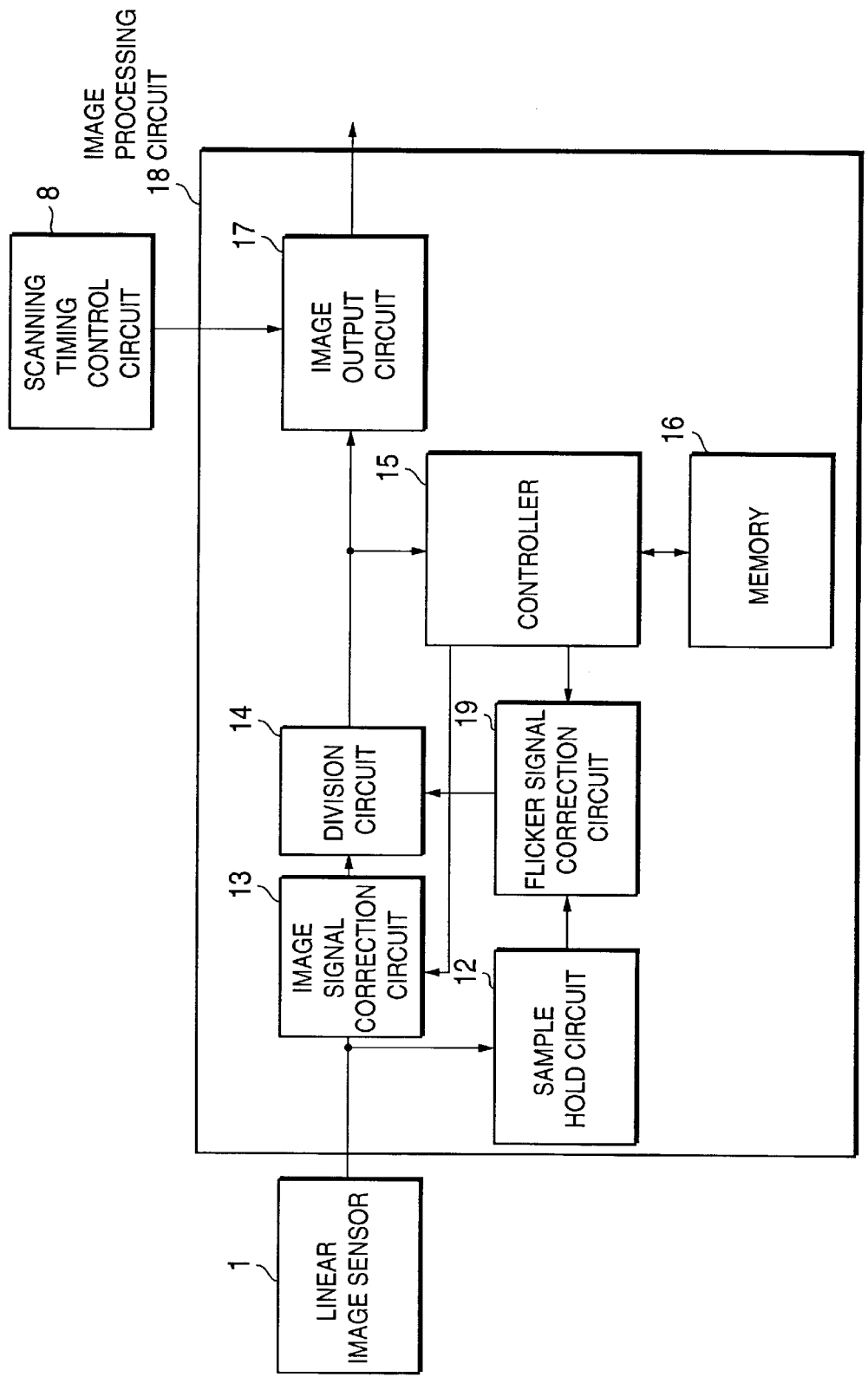
FIG. 5 is a block diagram showing the constitution of a second embodiment of the present invention.

FIG. 5 is a block diagram showing the constitution of the second embodiment of the present invention.

The second embodiment is different from the first embodiment in that the offset voltage is added both to the flicker detection signal branched from the image signal and the image signal.

An operation for determining two offset voltages to be added to the image signal and the flicker detection signal in the second embodiment of the present invention will next be described with reference to the drawing.

Figure 6:
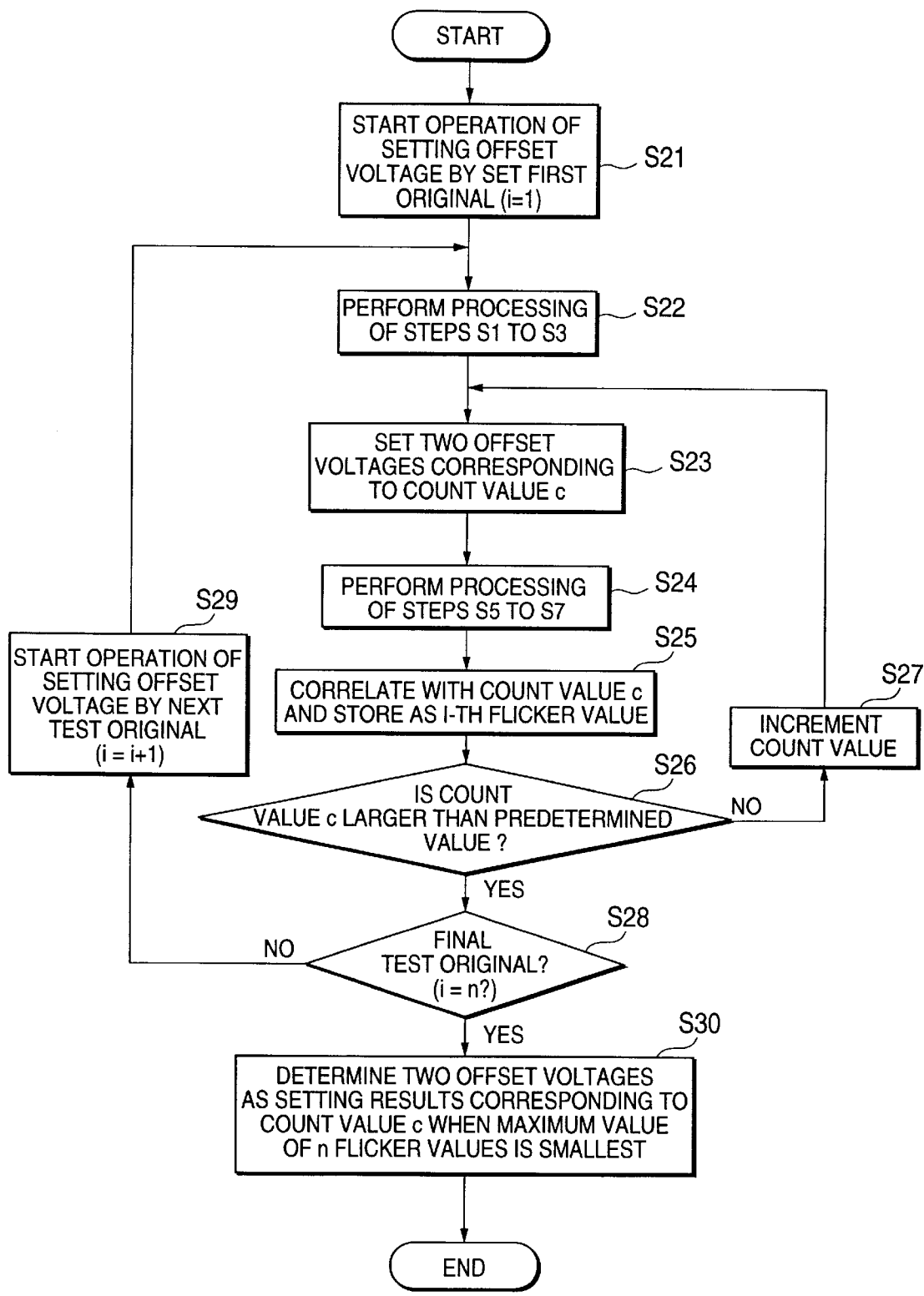
FIG. 6 is a flowchart showing the operation for determining the offset voltage in the second embodiment of the present invention.

FIG. 6 is a flowchart showing the operation of determining two offset voltages to be added to the image signal and the flicker detection signal, respectively, in the second embodiment of the present invention.

For test originals which are not entirely black and have the same density, n types (n being 2 or more) are prepared, a first test original is first set in a reading range, and the start of the offset voltage setting operation is instructed (step S21). Additionally, since there are two offset voltages to be determined, not only the test originals with one type of density but also the test originals with two or more types of densities are necessary. Subsequently, the operation of the steps S1 to S3 of the first embodiment is performed. Specifically, the operation comprises setting a predetermined scanning area portion with respect to the original as the read object by the operator's input, controlling the sub-scanning mechanism by the scanning timing control circuit 8 so that the sub-scanning mechanism 4 is moved so as to input the image of the preset partial sub-scanning area into the linear image sensor 1, and then setting the count value c to zero (step S22). Subsequently, the controller 15 refers to the offset voltage determining table (not shown) indicating two offset voltages to be added in the image signal correction circuit 13 and the flicker detection signal correction circuit 19 corresponding to the count value c counting the number of times in which the partial sub-scanning has been performed, and sets the offset voltages predetermined corresponding to the count value c (step S23). Subsequently, the operation of steps S5 to S7 of the first embodiment is performed. Specifically, the operation comprises obtaining the image data of the partial sub-scanning area of the test original image, storing into the memory the image data obtained by adding the offset voltages set by the controller 15 by the image signal correction circuit 13 and the flicker detection signal correction circuit 19 and performing the division by the division circuit 14, averaging the data of the main scanning direction with respect to the frequency p read in the time equal to or longer than one period of the flicker of adjusting data for each line unit, and calculating the fluctuation value of the data averaged for a plurality of lines (step S24). Subsequently, the value is correlated with the count value c, and the calculated flicker fluctuation value is stored as a first flicker fluctuation value (step S25). It is then judged whether the count value c is larger than the predetermined value r (step S26). When the value is smaller, the count value c is incremented (step S27), then returning to the step S23, in which by referring to the offset voltage determining table based on the count value c to set new offset voltages, the image data of the same partial sub-scanning area as the previous area is obtained, then repeating the processing of the steps S23 to S26.

In the step S26, when the count value c is larger than the predetermined frequency r, it is judged whether the test original with the measured flicker value is a final test original, that is, it is judged whether i=n (step S28). When the original is not final, the next test original is set in the reading range. Upon receiving the instruction to start the operation, the operation by the next test original is started (step S29). Then, the processing of the steps S22 to S28 is repeated.

When the final test original is judged in the step S28, fluctuation values are compared among r flicker fluctuation values stored for each type of test originals having different densities from others to retrieve the smallest value, and two offset voltages corresponding to the count value c are determined as the offset voltages for image signal correction and flicker detection signal correction to minimize the flicker in the installation conditions of that time (step S30).

By these operations, the flicker values are confirmed with respect to at least two densities and optimum offset voltages can be determined, so that the flicker value can be reduced with respect to the original having a wide range of density.

Moreover, in the image input device constituted to detect the flicker from the light radiated to the original surface, there are a time zone in which the light diffused from a window in addition to a ceiling lamp is radiated in day use depending on the device installation environment, and a time zone in which the light is radiated only by the ceiling lamp, and the offset component deviation attributed to the natural light occurs in the flicker detection signal and the image signal depending on the time zone.

However, when the use environment changes day and night as described above, and the offset component deviation attributed to the natural light is generated in the flicker detection signal and the image signal, in the embodiment, the flicker detection signal and the image signal can accurately be corrected, so that the flicker components can be removed.

Additionally, in the above description, the n types (n being 2 or more) of the test originals of the same density are prepared, and measurement is performed with the predetermined frequency of r times before the next test original is set, but one sheet of test original may be provided with n types of densities. In this case, in the step S22, different scanning areas need to be set in accordance with the density of the object to be read, but the trouble of changing the test originals can be saved.

Moreover, by disposing areas of n types of densities in a position close to a portion of the stand section 11 in which the original 2 is set, each area image may be read r times to set the offset voltages.

A modification of image processing circuit 18 will next be described.

Figure 7:
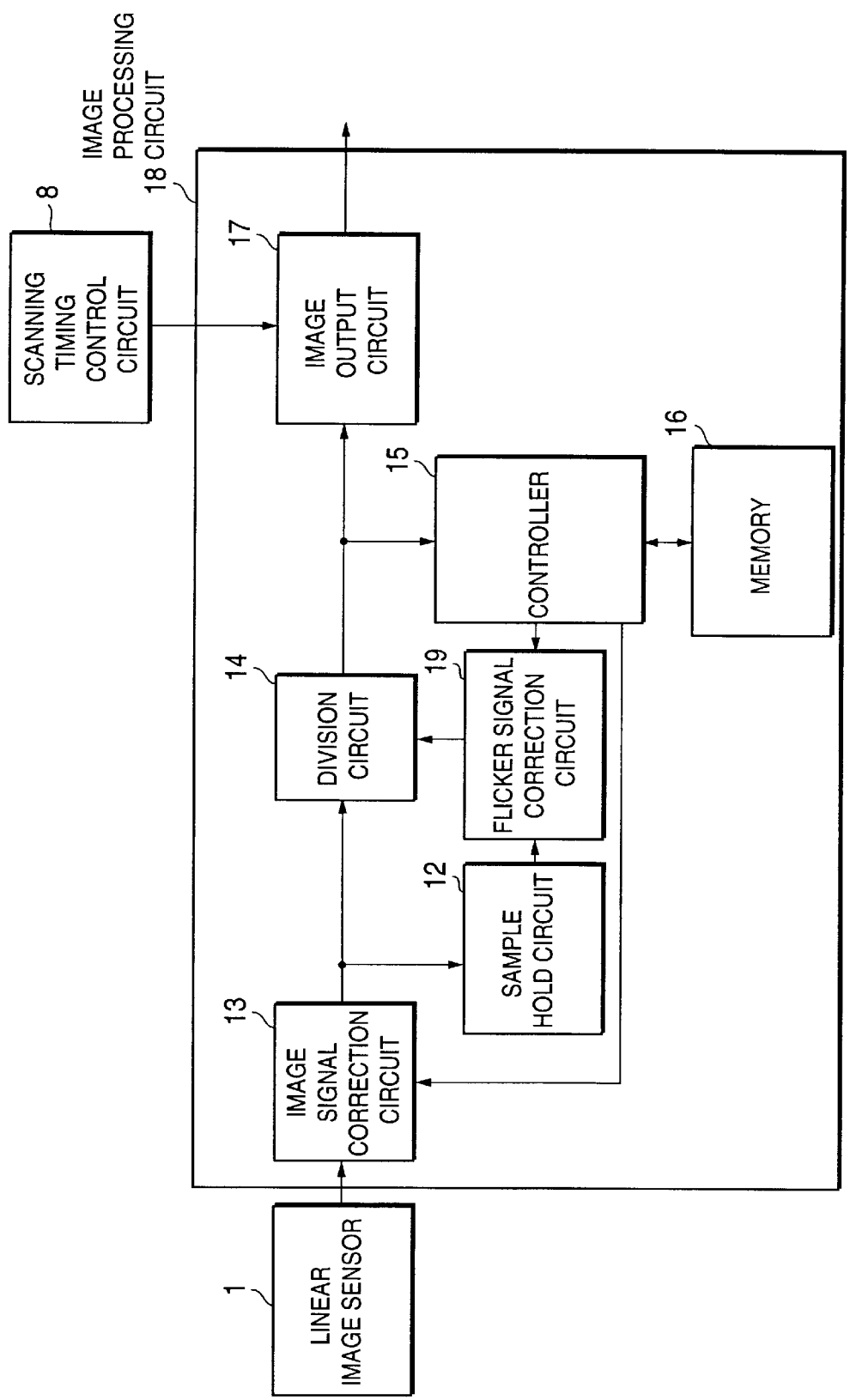
FIG. 7 is a block diagram showing a second example of the image processing circuit according to the second embodiment of the present invention.

FIG. 7 is a block diagram showing a second example of the image processing circuit according to the second embodiment.

The second example is different from the first example in that instead of the image signal outputted from the linear image sensor 1, the corrected image signal to which the offset voltage is added for the correction by the image signal correction circuit 13 is inputted to the sample hold circuit 12.

Additionally, in FIG. 7, there is provided a flicker detection signal correction circuit which adds the offset voltage to the flicker detection signal outputted from the sample hold circuit to correct the flicker detection signal, but instead of the circuit, there may be provided a second image signal correction circuit which further adds the offset voltage to the image signal inputted to the sample hold circuit 12 to perform the correction.

Moreover, another example of the image input mechanism section according to the first and second embodiments of the present invention will be described.

Figure 8:
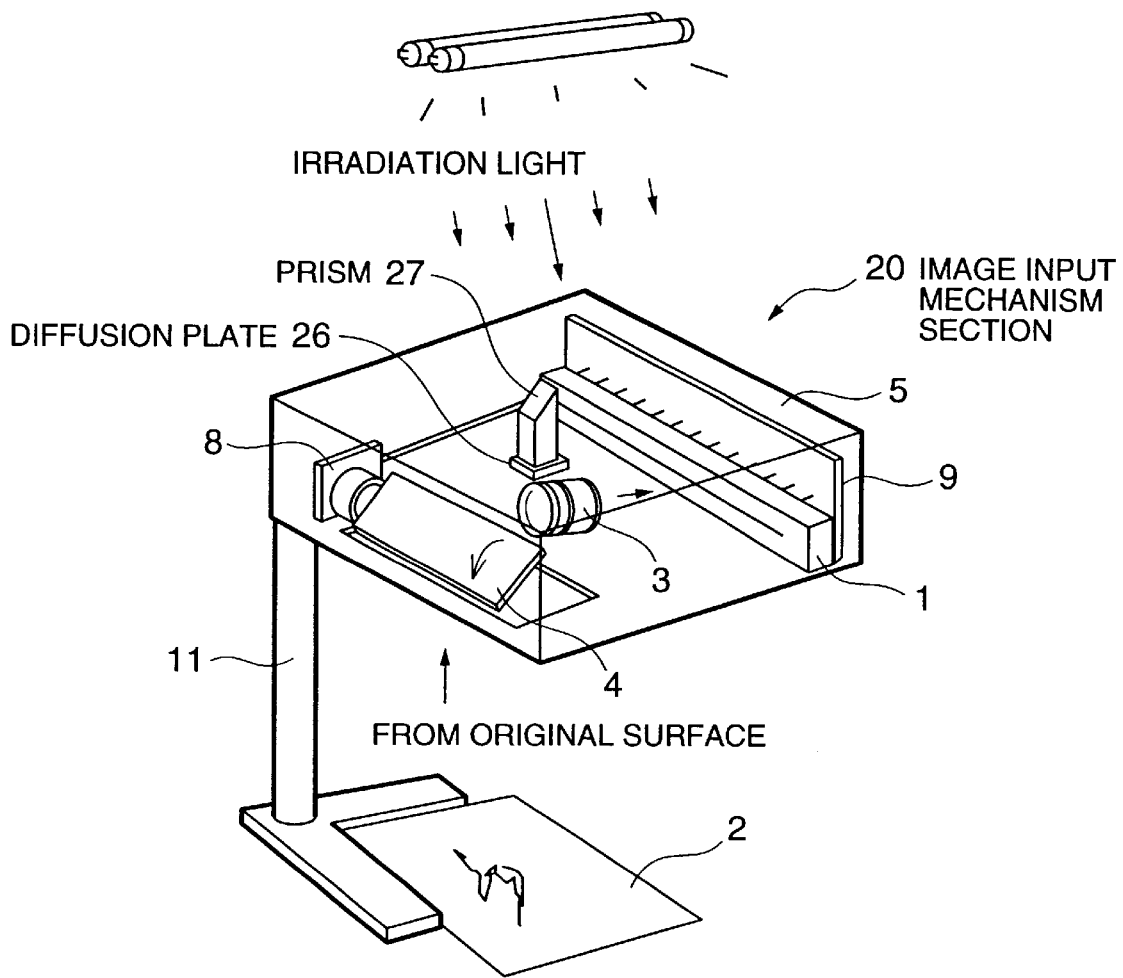
FIG. 8 is a schematic view showing a second example of an image input mechanism section according to the present invention.

FIG. 8 is a schematic view showing the second example of the image input mechanism section according to the first and second embodiments of the present invention.

The second example is different from the first example in that a diffusion plate 26 is directed downward, not upward from the cover, and the light reflected from the original surface is used in detection for the flicker correction. Specifically, there is provided a prism 27 which obtains light from the side of the original surface, not from the side of the ceiling to guide the light to the linear image sensor 1.

Also in this example of the image input mechanism section, the operation of determining the offset voltage to remove the flicker residual component attributed to the nonlinearity of the linear image sensor and the flicker residual component by the circuit noise can also be performed according to the same flowchart of the processing as the above-described flowchart.

In the second example of the image input mechanism section the optical path of image input is the same as the flicker detection optical path during low output, and the flicker is detected in response to the light actually radiating to the original. Therefore, even when much light is radiated to the original from the directions other than the upward direction, the correction of the flicker included in the image signal can appropriately be performed.

As described above, in the present invention, the voltage is added to the lighting light quantity signal or the image signal to eliminate the influence by the nonlinearity of the photoelectric conversion property of the linear image sensor and the lighting light detecting section, and the division is performed by using the lighting light quantity signal or the lighting light quantity signal with the voltage added thereto as the denominator input and the image signal with the voltage added thereto or the image signal as the numerator input. By this constitution, when the light from the original is weak, and the image signal output of a sufficient voltage cannot be obtained from the linear image sensor, when the offset voltage of the plus voltage or the minus voltage is superimposed as the noise to the image signal output from the linear image sensor, further even when the input light quantity from the original is micro to a degree to which the nonlinearity becomes remarkable in the photoelectric conversion property of the linear image sensor, the adverse influence of the offset voltage or the nonlinearity of the photoelectric conversion property of the linear image sensor is removed, and the virtual black voltage obtained by extending the linear property of the portion in which the image signal is generated can be allowed to agree with zero.

Moreover, in the present invention, the voltage is added to both the lighting light quantity signal and the image signal to eliminate the influence by the nonlinearity of the photoelectric conversion property of the linear image sensor and the lighting light detecting section, and the division is performed by using the lighting light quantity signal with the voltage added thereto as the denominator input and the image signal with the voltage added thereto as the numerator input.

By this constitution, not only the virtual black voltage obtained by extending the linear property of the portion in which the image is formed and the image signal is generated, but also the virtual black voltage obtained by extending the linear property of the photoelectric conversion element used for detecting the lighting light quantity can be allowed to accurately agree with zero, and the flicker correction by the division is appropriately processed. Even when the detected lighting light quantity has a brightness such that the nonlinearity of the linear image sensor raises a problem, the flicker removing correction can securely be performed, and the image quality of the input image can be enhanced. Moreover, even when the use environment changes day and night and the offset component deviation attributed to the natural light is generated in the flicker detection signal and the image signal, the flicker components can be removed to a sufficiently satisfying degree.

What is claimed is:

1. An image input device, comprising:
   a linear image sensor provided with a plurality of linearly arranged light receiving elements for outputting an image signal of a linear image formed on the light receiving element;
   an image forming optical system for forming an image of a linear area on an original onto a row of the light receiving elements of said linear image sensor;
   a sub-scanning mechanism for moving said linear area formed into the image on said linear image sensor to scan the entire image of the original by the linear image sensor;
   a lighting light quantity detecting section for outputting a lighting light quantity signal indicative of a voltage corresponding to a lighting light quantity radiating to the original;
   a correction voltage adding section for adding a correction voltage to at least one of said lighting light quantity signal and said image signal to eliminate an influence by nonlinearity of a photoelectric conversion property of said linear image sensor and the lighting light detecting section; and
   a correcting section for eliminating a voltage fluctuation by a fluctuation of the lighting light quantity of said lighting light quantity signal, the image signal with or without said correction voltage added thereto based on the lighting light quantity signal without or with said correction voltage added thereto,
   wherein said correction voltage adding section comprises one of a first voltage adding circuit for adding a first voltage to said lighting light quantity signal to eliminate the influence by the nonlinearity of the photoelectric conversion property of said linear image sensor and the lighting light detecting section, and a second voltage adding circuit for adding a second voltage to said image signal to eliminate the influence by the nonlinearity of the photoelectric conversion property of said linear image sensor and the lighting light detecting section,
   wherein said correcting section comprises a division circuit for using said lighting light quantity signal as a denominator input and the image signal with said second voltage added thereto as a numerator input to perform division when said correction voltage adding section comprises a second voltage adding circuit, or using said lighting light quantity signal with said first voltage added thereto as a denominator input and the image signal as a numerator input to perform division when said correction voltage adding section comprises a first voltage adding circuit.

2. The image input device according to claim 1, wherein said correction voltage adding section comprises a first voltage adding circuit for adding a first voltage to said lighting light quantity signal to eliminate the influence by the nonlinearity of the photoelectric conversion property of said linear image sensor and the lighting light detecting section, and
   a second voltage adding circuit for adding a second voltage to said image signal to eliminate the influence by the nonlinearity of the photoelectric conversion property of said linear image sensor and the lighting light detecting section,
   said correcting section comprises a division circuit for using the lighting light quantity signal with said first voltage added thereto as a denominator input, and using the image signal with said second voltage added thereto as a numerator input to perform division.

3. The image input device according to claim 2, further comprising a voltage determining section which sets said first and second voltages in a plurality of stages for each of two or more images of a plurality of types of densities, reads an image of a predetermined position of the original a plurality of times for each voltage setting and calculates a voltage fluctuation amount of the corrected image signal outputted from a dividing section, obtains a voltage setting to minimize a plurality of voltage fluctuation values corresponding to the densities, and determines said first and second voltages.

4. The image input device according to claim 3, wherein said voltage determining section sets an area not black on the original and reads an image of the area to determine said first and second voltages.

5. The image input device according to claim 3, further comprising a stand section which supports an image input mechanism section comprising said linear image sensor, said image forming optical system, said sub-scanning mechanism and said lighting light quantity detecting section apart from said original, and which comprises a portion having a non-black density and disposed in the vicinity of the original, wherein
   said voltage determining section reads an image of the portion of said stand section disposed in the vicinity of the original to determine said first and second voltages.

6. The image input device according to claim 1, further comprising a voltage determining section which sets said first or second voltage in a plurality of stages, reads an image of a predetermined position of the original a plurality of times for each voltage setting and calculates a voltage fluctuation amount of the corrected image signal outputted from a dividing section, obtains a voltage setting to minimize said voltage fluctuation amount, and determines said first or second voltage.

7. The image input device according to claim 6, wherein said voltage determining section sets an area not black on the original and reads an image of the area to determine said first or second voltage.

8. The image input device according to claim 6, further comprising a stand section which supports an image input mechanism section comprising said linear image sensor, said image forming optical system, said sub-scanning mechanism and said lighting light quantity detecting section apart from said original, and which comprises a portion having a non-black density and disposed in the vicinity of the original, wherein
   said voltage determining section reads an image of the portion of said stand section disposed in the vicinity of the original to determine said first and second voltages.

9. The image input device according to claim 1, wherein said correction voltage adding section comprises a first voltage adding circuit for adding a first voltage to said image signal and the lighting light quantity signal to eliminate the influence by the nonlinearity of the photoelectric conversion property of said linear image sensor and the lighting light detecting section, and a second voltage adding circuit for adding said first voltage as well as a second voltage to said lighting light quantity signal with said first voltage added thereto to eliminate the influence by the nonlinearity of the photoelectric conversion property of said linear image sensor and the lighting light detecting section, said correcting section comprises a division circuit for using the lighting light quantity signal with said first voltage and the second voltage added thereto as a denominator input, and using the image signal with said first voltage added thereto as a numerator input to perform division.

10. The image input device according to claim 1, wherein said lighting light quantity detecting section is a part of an image reading start side of said linear image sensor.

11. The image input device according to claim 10, further comprising:

a diffusion plate for diffusing and taking lighting light radiating from above; and a prism for transmitting the light taken from said diffusion plate to the part of the image reading start side of said linear image sensor.

12. The image input device according to claim 10, further comprising:

a diffusion plate directed downward for diffusing and taking light reflected from an original surface; and a prism for transmitting the light taken from said diffusion plate to the part of the image reading start side of said linear image sensor.

13. An image input method, comprising the steps of:

forming an image of a linear area on an original onto a row of light receiving elements of a linear image sensor provided with a plurality of linearly arranged light receiving elements and moving said linear area formed into the image to scan the entire image of the original by the linear image sensor;

allowing said linear image sensor to output an image signal of the linear image formed on said light receiving elements;

allowing a lighting light quantity detecting section to output a lighting light quantity signal indicative of a voltage corresponding to a lighting light quantity radiating to the original;

adding a voltage to at least one of said lighting light quantity signal and said image signal to eliminate an influence by nonlinearity of a photoelectric conversion property of said linear image sensor and the lighting light detecting section and eliminating a voltage fluctuation of the image signal based on a fluctuation of the lighting light quantity; and changing a setting of the voltage to be added to either one of said lighting light quantity signal and said image signal before the linear image sensor scans the entire image of the original and scanning a predetermined portion of said original a plurality of times and determining the voltage to be added to either one of said lighting light quantity signal and said image signal to eliminate the voltage fluctuation of the image signal based on the fluctuation of the lighting light quantity during the entire scanning.

14. The image input method according to claim 13, wherein the step of determining the voltage to be added to said lighting light quantity signal and said image signal comprises the steps of:

adding the voltage set corresponding to scanning times of said predetermined scanning area to at least one of said lighting light quantity signal and said image signal, eliminating the voltage fluctuation of the image signal based on the fluctuation of the lighting light quantity and outputting a signal;

comparing fluctuation values of the signals outputted in the scanning times; and determining the voltage set in the scanning times when the fluctuation value is smallest as the voltage to be added to either one of said lighting light quantity signal and said image signal during the entire scanning.

15. The image input method according to claim 13, further comprising the steps of changing settings of the voltages to be added to said lighting light quantity signal and said image signal with respect to at least two originals having mutually different and uniform densities and performing scanning a plurality of times before the linear image sensor scans the entire image of the original, and determining the voltages to be added to said lighting light quantity signal and said image signal to eliminate the voltage fluctuation of the image signal based on the fluctuation of the lighting light quantity during the entire scanning.

16. The image input method according to claim 15, wherein the step of determining the voltage to be added to either one of said lighting light quantity signal and said image signal comprises the steps of:

outputting a signal from which the voltage fluctuation of the image signal based on the fluctuation of the lighting light quantity is eliminated by adding the two voltages set corresponding to each of the scanning times of said predetermined scanning area to said lighting light quantity signal and said image signal in each of said at least two originals, and calculating a fluctuation value of the signal outputted in each of the scanning times;

storing at least two fluctuation values calculated for each of the scanning times corresponding to the scanning times; and comparing fluctuation values among the fluctuation values in respective scanning times to retrieve a smallest value, and determining said two voltages corresponding to the scanning times as two voltages to be added to said lighting light quantity signal and said image signal during the entire scanning.

* * * * *